(12) United States Patent
Shim et al.

(10) Patent No.: US 7,488,095 B2
(45) Date of Patent: Feb. 10, 2009

(54) PRISM SHEET OF BACK LIGHT UNIT FOR LCD

(75) Inventors: Young-Shig Shim, KyoungKi-Do (KR);
Sung-Min Cho, KyoungKi-Do (KR);
Soon-Ryong Park, KyoungKi-Do (KR);
Eun-Mi Lee, KyoungKi-Do (KR)

(73) Assignee: LMS Co., Ltd., Gunpo-si, Kyunggi-do ( * ) Notice: Subject to any disclaimer, the term of this patent is extended or adjusted under 35 U.S.C. 154(b) by 124 days.

(21) Appl. No.: 10/562,263

(22) PCT Filed: Oct. 13, 2003

(86) PCT No.: PCT/KR03/02102

§ 371 (c)(1),
(2), (4) Date: Dec. 28, 2005

(87) PCT Pub. No.: WO2005/003851

PCT Pub. Date: Jan. 13, 2005

(65) Prior Publication Data
US 2007/0097708 A1    May 3, 2007

(30) Foreign Application Priority Data
Jul. 1, 2003    (KR) .................... 10-2003-0044316

(51) Int. Cl.
*F21V 7/04* (2006.01)
(52) U.S. Cl. .............. 362/362; 362/606; 362/607; 362/626; 359/837; 349/64
(58) Field of Classification Search ............ 362/26, 362/606, 607, 620, 626; 359/837; 349/64
See application file for complete search history.

(56) References Cited

U.S. PATENT DOCUMENTS

| | | |
|---|---|---|
| 6,354,709 B1* | 3/2002 | Campbell et al. ........... 362/627 |
| 6,692,133 B2* | 2/2004 | Katsu et al. ................. 362/620 |
| 2005/0141243 A1* | 6/2005 | Mullen et al. ............... 362/600 |

FOREIGN PATENT DOCUMENTS

| | | |
|---|---|---|
| JP | 9160507 | 6/1997 |
| JP | 2001004846 | 1/2001 |
| JP | 2001188126 | 7/2001 |

OTHER PUBLICATIONS

International Search Report for PCT/KR2003/002102.

* cited by examiner

*Primary Examiner*—Sandra L. O'Shea
*Assistant Examiner*—Meghan K. Dunwiddie
(74) *Attorney, Agent, or Firm*—Lowe Hauptman Ham & Berner, LLP

(57) ABSTRACT

Disclosed is a prism sheet structure that can control optical coupling between contact surfaces of two prism sheets in a backlight unit. The prism sheet includes: a structural surface (14) having non-planar peaks (11) with maximum height and minimum height along a length direction thereof; and a curved layer (17) having the same cycle as a cycle of height variation of the peak. The curved layer is formed at a boundary surface (16) between the structural surface 14 and the flat surface to maintain the right-angled isosceles triangular prisms formed due to a difference between the highest point and the lowest point of each of the peaks to have a predetermined size, so that distance between the valleys (12) is uniform along the length direction. Although shapes of prisms are identical, the cycle of the peak height variation allows the moirépatterns to be suppressed or removed.

15 Claims, 9 Drawing Sheets

[FIG. 1]
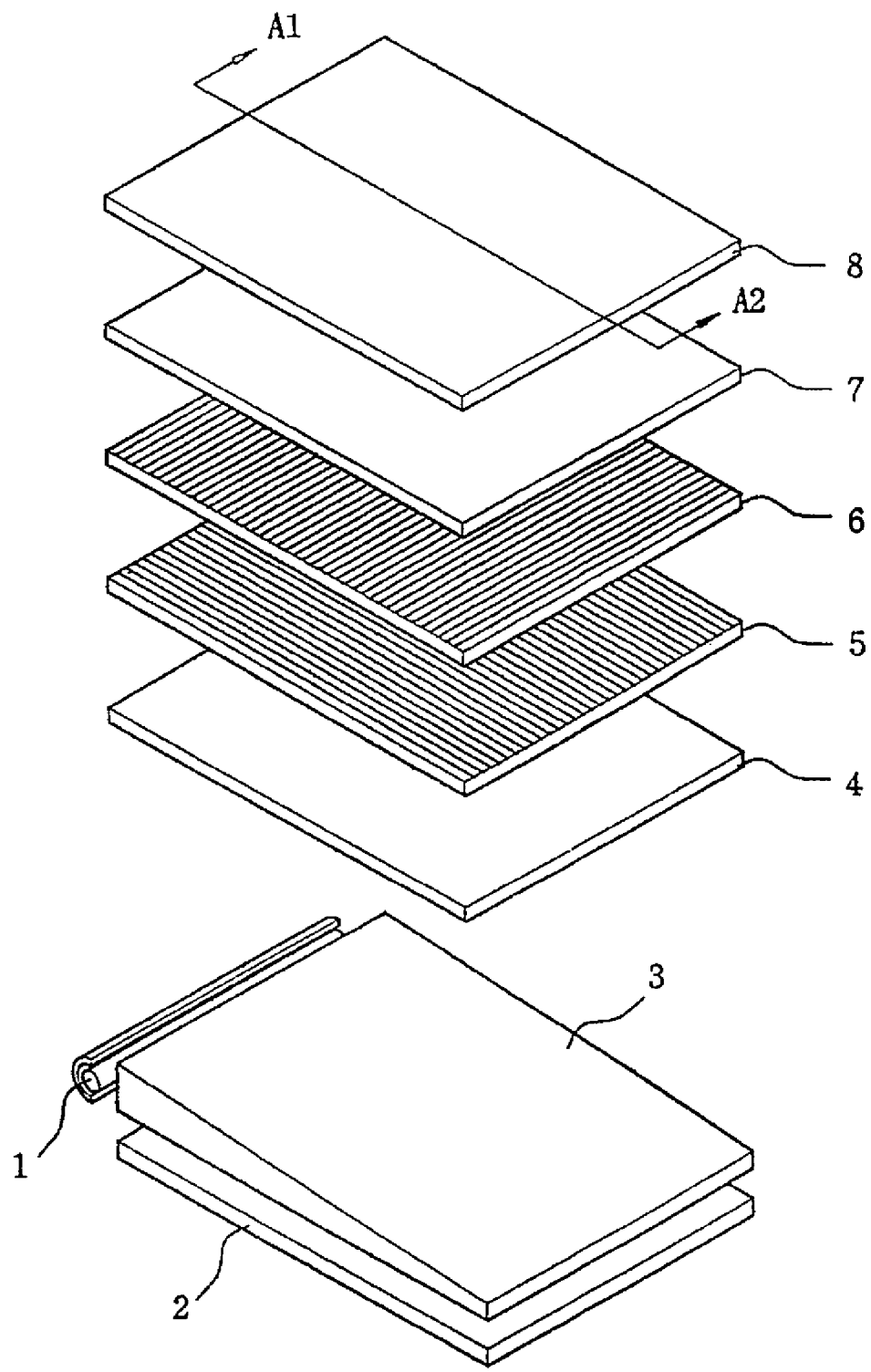

[FIG. 2]
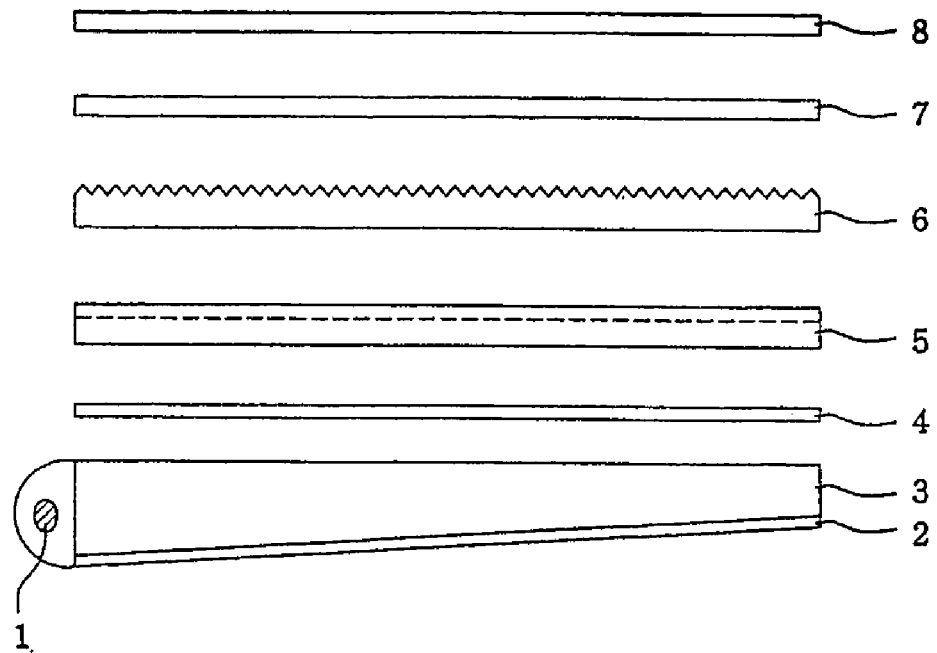

[FIG. 3a]
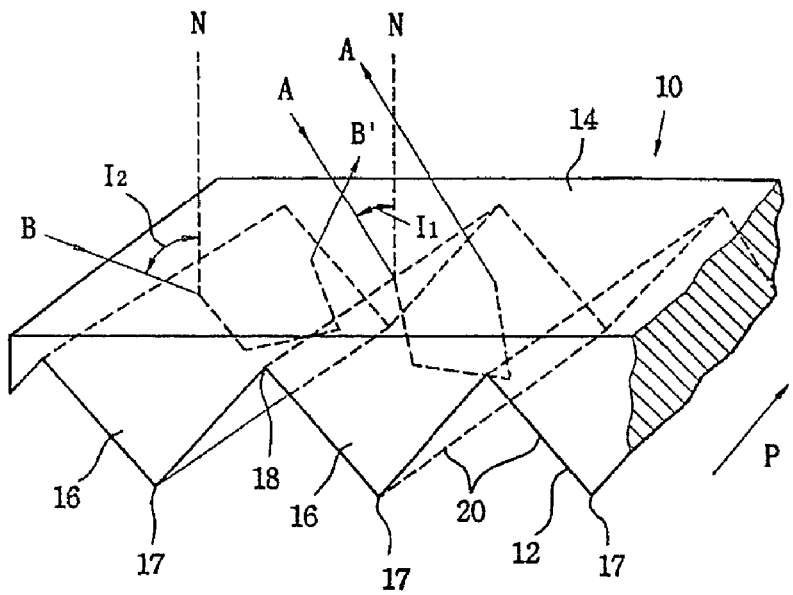
[FIG. 3b]
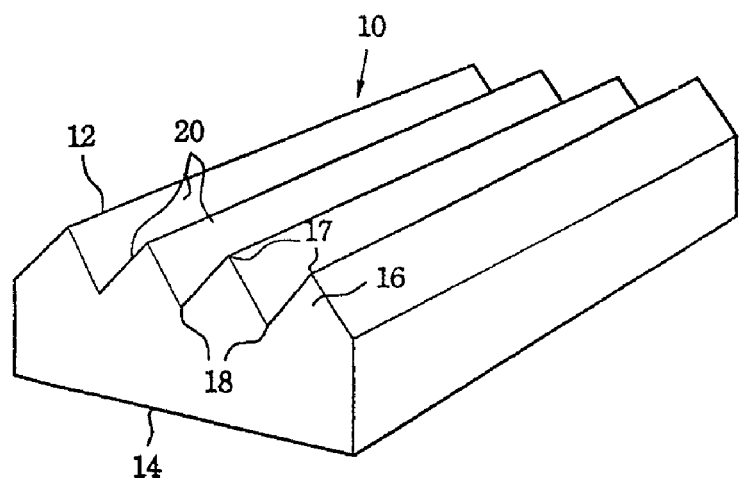

[FIG. 4]
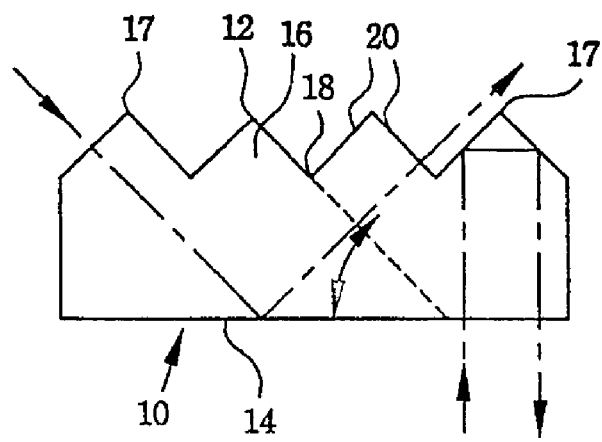
[FIG. 5]
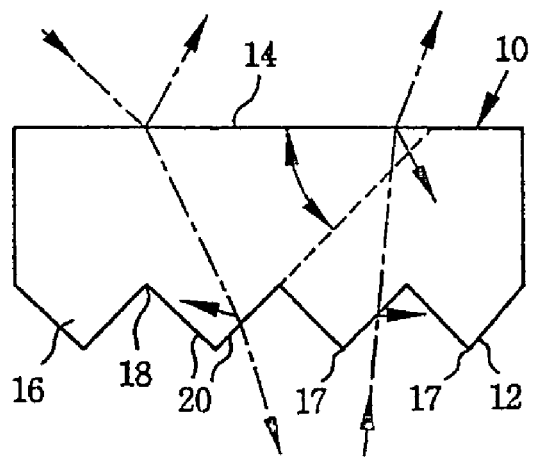

[FIG. 6a]
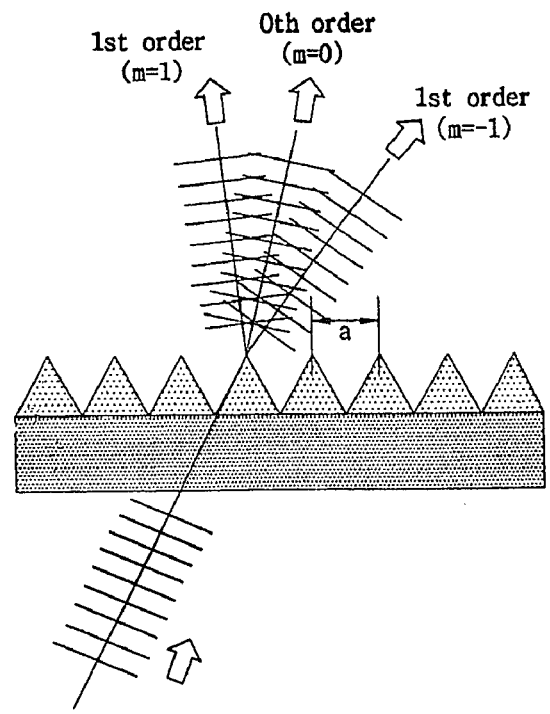
[FIG. 6b]
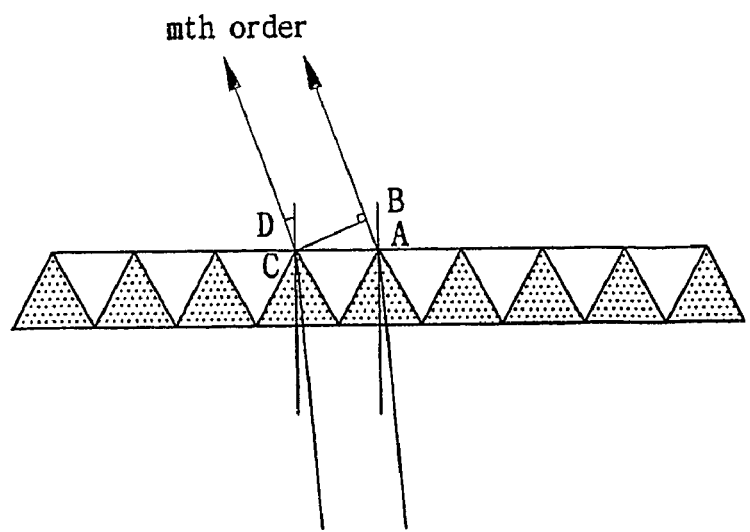

[FIG. 7a]
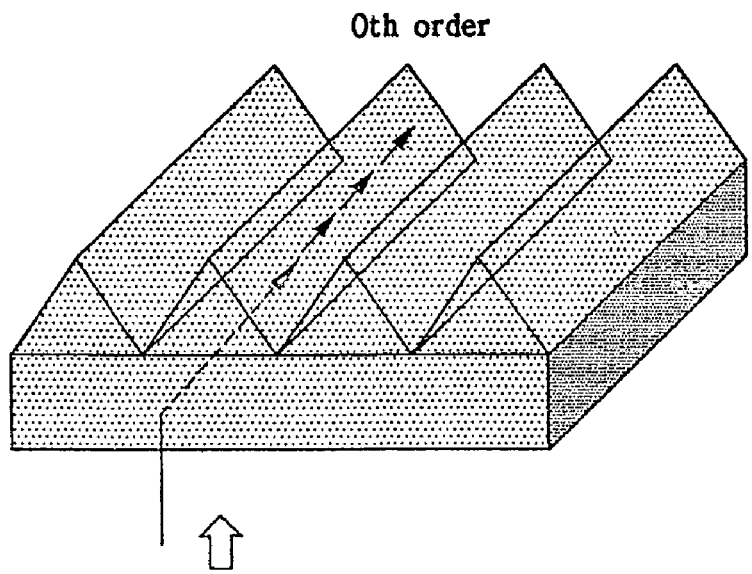
[FIG. 7b]
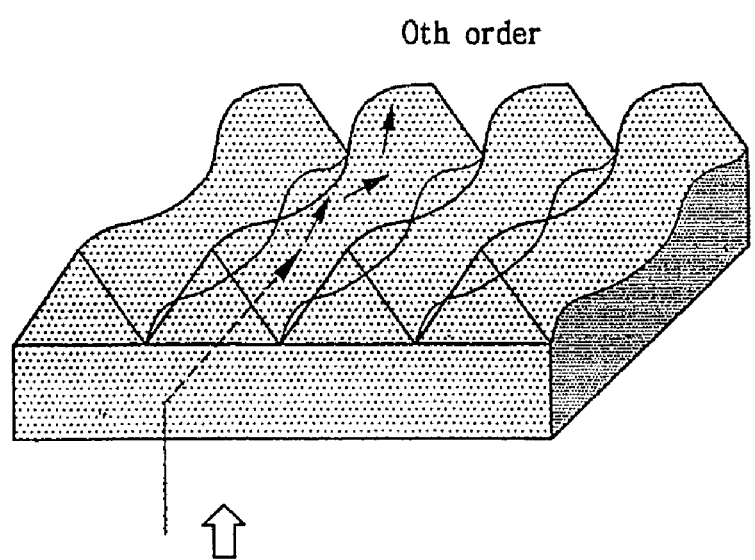

[FIG. 8a]
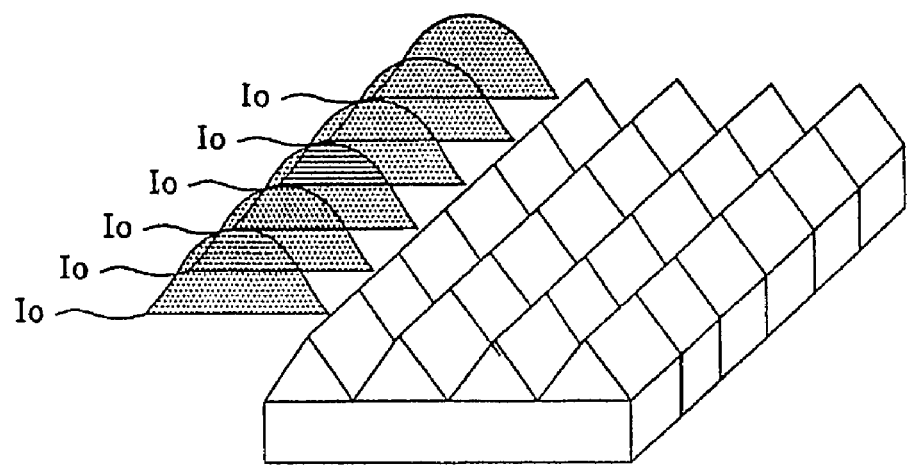
[FIG. 8b]
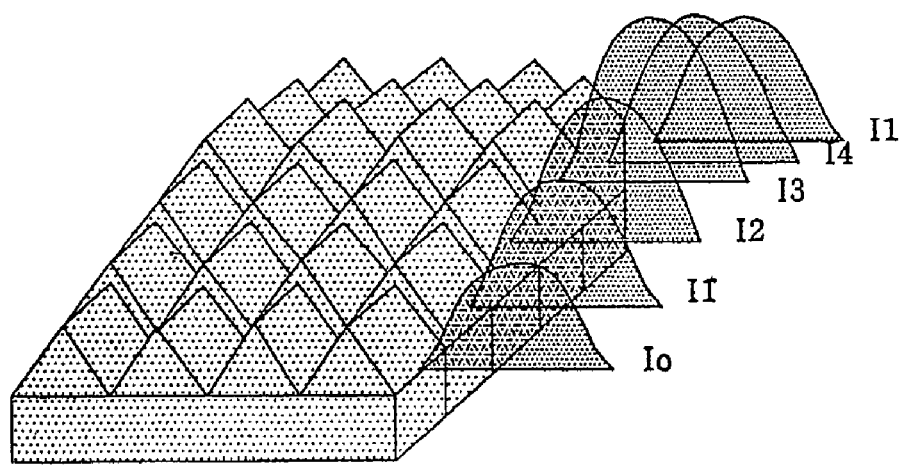

[FIG. 9]
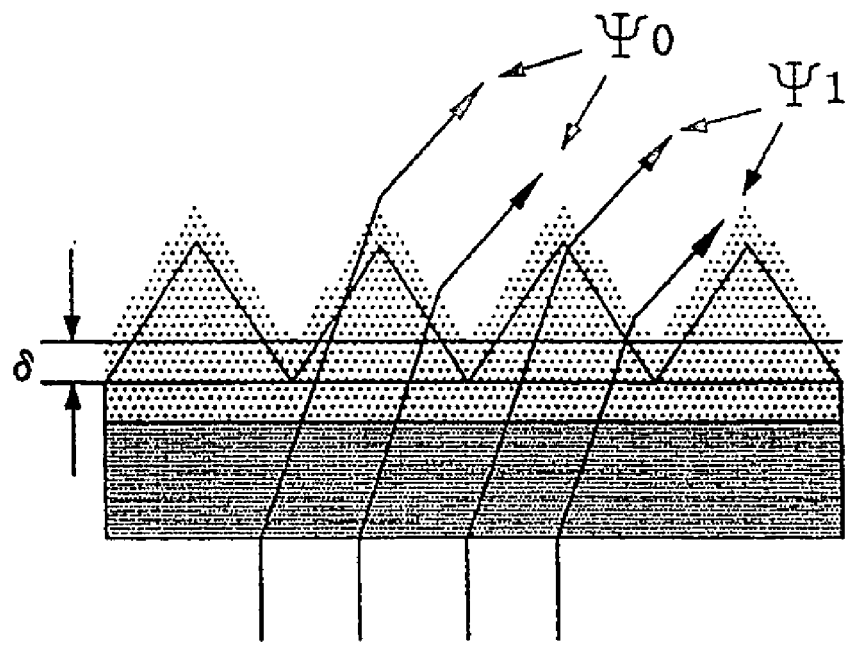

[FIG. 10a]
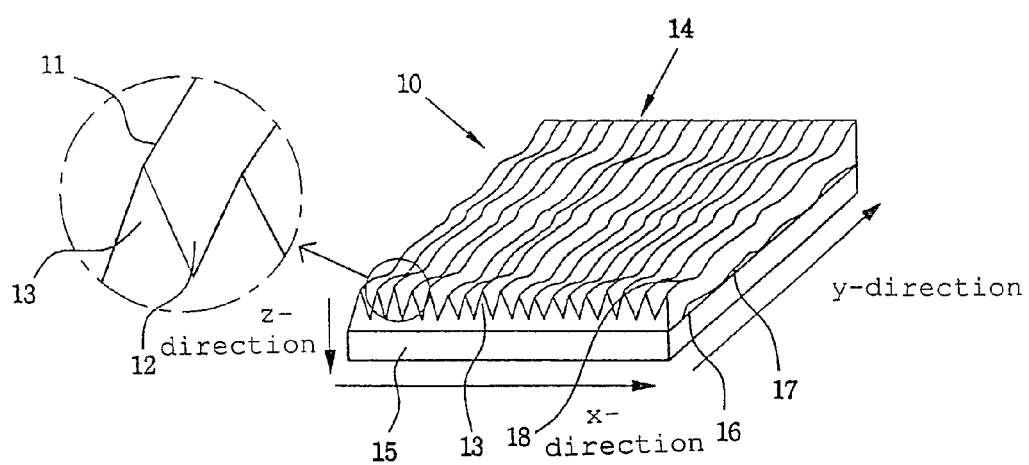
[FIG. 10b]
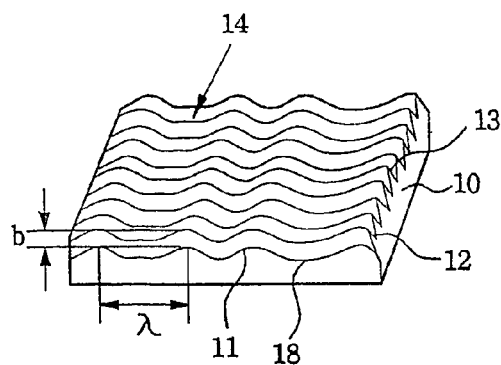

PRISM SHEET OF BACK LIGHT UNIT FOR LCD

CROSS REFERENCE TO RELATED APPLICATION

This application is the National Phase application of International Application No. PCT/KR2003/002102, filed Oct. 13, 2003, which designates the United States and was published in English. This application, in its entirety, is incorporated herein by reference.

TECHNICAL FIELD

The present invention relates to a prism sheet of a backlight unit for an LCD, and more particularly, to a prism sheet for reducing Moiré phenomenon caused by a contact between prism sheets by providing a structure to control an optical coupling generated between contact surfaces of prism sheets configured to enhance the front brightness of light emitted from a backlight unit.

BACKGROUND ART

Unlike a conventional cathode ray tube, a liquid crystal display (LCD) that is recently popular as a general display means or a monitor consumes very low electric power and is thin and light since it does not employ the electronic gun. So, in these days, the LCD has been rapidly developed and widely used.

Since the LCD cannot emit light by itself, it employs a method controlling light amount by reflecting or transmitting light. The light source employed in the transmission type LCD that is widely used is called a backlight unit. The performance of the LCD depends seriously on that of the backlight unit.

FIGS. 1 and 2 are diagrams illustrating structure of a backlight unit employed in the LCD. The backlight unit includes a fluorescent lamp 1, a reflecting plate 2, a light guide plate 3, a diffusion sheet 4, a first prism sheet 5, a second prism sheet 6 and a protection sheet 7. An LCD panel 8 is mounted on the top of the backlight unit.

As shown in FIG. 2, if a voltage is applied to the fluorescent lamp 1, residual electrons in the fluorescent lamp 1 moves to anode. When the residual electrons moving to the anode of the fluorescent lamp 1 collide with molecules of argon (Ar), argon is excited and thereby cation increases. The increased cation collides with cathode of the fluorescent lamp 1 and secondary electrons are emitted from the cathode of the fluorescent lamp 1.

The emitted secondary electrons flow inside a tube of the fluorescent lamp 1 and starts discharge. The electrons flowing due to the discharge collide with mercury vapor. The mercury vapor is ionized to emit ultraviolet ray and visible light. The emitted ultraviolet ray excites fluorescent substance coated on the inner surface of the tube of the fluorescent lamp 1 to emit visible light.

The emitted visible light travels along the light guide plate 3 that has a slant lower surface. On the lower surface of the light guide plate 3, a variety of patterns such as a fine dot pattern are printed in order to change the traveling direction of the visible light toward the LCD panel 8 so that light loss is reduced and the light is guided to an upper surface of the light guide plate 3.

Here, the light transmitting through the upper surface of the light guide plate 3 includes not only beams emitted perpendicular to the upper surface but also beams emitted slant in various angles.

Between the light guide plate 3 and the first prism sheet 5, a diffusion sheet 4 is placed to diffuse the light that is incident from the light guide plate 3, thereby preventing the light from being locally concentrated and also functioning to change the direction of the light traveling toward the first prism sheet 5 and to thus reduce a slant angle with respect to the first prism sheet 5.

The first prism sheet 5 and the second prism sheet 6 are provided with triangular prisms formed in a predetermined arrangement on the upper surfaces thereof. The first prism arrangement of the first prism sheet 5 and the second prism arrangement of the first prism sheet 6 are crossed with each other by a predetermined angle.

The first prism sheet 5 and the second prism sheet 6 condense the light diffused from the diffusion sheet 4 in the direction perpendicular to the LCD panel 8. Accordingly, the orthogonal incidence characteristic of the light passing through the first prism sheet 5 and the second prism sheet 6 to the protection sheet 7 can be obtained completely.

Therefore, the light passing through the first prism sheet 5 and the second prism sheet 6 travels almost perpendicularly with respect to the first prism sheet 5 and the second prism sheet 6, so that the brightness distribution on the protection sheet 7 can be obtained uniformly.

According to the prism sheet adapted to the conventional backlight unit, the peaks of the prism sheet are maintained at the same height along the length direction of the stripe shape, so that the optical coupling is made between the peak portion of the first prism sheet 5 positioned at a lower portion and the flat surface of the second prism sheet 6 positioned at an upper portion if the first prism sheet and the second prism sheet are used in fold. So, the moiré phenomenon that a pattern of lines is visibly shown is caused and the quality of image displayed on a screen deteriorates.

The prism sheet structure adapted to a backlight unit is disclosed as a flexible thin film in Korean patent laid-open publication No. 1987-0005258.

FIGS. 3A and 3B illustrate a flexible film employed as a prism sheet of the backlight unit. This flexible thin film has a structural surface 12 on one side thereof and a flat surface 14 on the other side thereof and is made of transparent polymer material.

The structural surface 12 of the film includes a linear arrangement of small right-angled isosceles triangular prisms arranged in parallel and is configured to have a plurality of peaks 17 and grooves 18 that are as long as the length of the film 10 as shown in FIGS. 4 and 5. When the film is positioned on the flat surface, the perpendicular surfaces 20 slant by an angle ($\alpha$) of about 45° with respect to the adjacent flat surface 14.

The incident light that strikes the structural surface 12 or the flat surface 14 in a predetermined angle is fully reflected from the other surface as shown in FIG. 4. If the light refracted by a first surface strikes a second surface by an angle larger than the critical angle with respect to the normal line, the light is fully reflected. The critical angle in air is defined to be arc sine of reciprocity of index of refraction of the material. As shown in FIG. 5, a great deal of the incident light striking the surface 12 or the surface 14 by an angle larger than the angle range is transmitted and the remainder is reflected. In both cases, the optical absorption due to the material is negligible.

The light 'A' that is incident into each of the flat surfaces 14 formed along a normal line of the flat surface 14 of the flexible thin film is refracted, and fully reflected at the structural surface 12 of the flexible thin film as shown in FIG. 3. Both the light 'A' and the normal line 'N' lie on the plane perpendicular to the direction P in which the prisms 16 of the structural surface 12 are arranged linearly. The light 'A' is fully reflected and projected as a reflection light 'A'' located on the same plane. Similarly, another light 'B' applied to the flat surface 14 on the plane not perpendicular to the direction P is exemplarily shown. The incident light B is reflected inside, and projected as the light 'B'' on another plane defined by the incident light B and the prism direction P.

However, when the flexible thin film is employed as the prism sheet of a backlight unit, the peaks of the prism sheet are maintained at the same height along the length direction of the stripe shape. So, if the first prism sheet and the second prism sheet are used in fold, the optical coupling is made between the peak portion of the first prism sheet positioned at a lower portion and the flat surface of the second prism sheet positioned at an upper portion. So, the moire phenomenon that a pattern of lines is visibly shown caused and the quality of image displayed on a screen deteriorates.

Accordingly, the present invention is directed to a prism sheet of a backlight unit for an LCD that substantially obviates one or more of the problems due to limitations and disadvantages of the related art.

An object of the present invention is to provide a prism sheet effectively applicable to a backlight unit.

Another object of the present invention is to reduce an optical coupling occurring in case peaks of prism sheets of a backlight unit are maintained at the same height along the length direction of the stripe shape and a first prism sheet and a second prism sheet are used in fold, by changing the structure of the prism sheet.

A further object of the present invention is to reduce moire phenomenon by minimizing an optical coupling caused between prism sheets when the prism sheets are arranged in fold so as to constitute the backlight unit.

Additional features and advantages of the invention will be set forth in the description which follows, and in part will be apparent from the description, or may be learned by practice of the invention. The objectives and other advantages of the invention will be realized and attained by the structure particularly pointed out in the written description and claims thereof as well as the appended drawings.

To achieve these and other advantages and in accordance with the purpose of the present invention, as embodied and broadly described, the present invention is characterized by a prism sheet having a structural surface on one side thereof and a flat surface opposing the structural surface on another side thereof, the structural surface including a linear arrangement of right-angled isosceles triangular prisms arranged in parallel and configured to form a plurality of peaks and valleys, each of the prisms having perpendicular surfaces that slant by an angle of approximately 45° with respect to the flat surface, wherein the structural surface is configured to have non-planar peaks with a maximum height and a minimum height along a length direction of the peak, and a curved layer having the same cycle as a cycle of height variation of the peak is formed at a boundary surface between the structural surface and the flat surface so as to maintain the right-angled isosceles triangular prisms formed due to a difference between the highest point and the lowest point of each of the peaks to have a predetermined size so that a distance between the valleys is uniform along the length direction.

When the structural surface of the prism sheet is changed and used as a prism sheet of a backlight unit, the optical coupling caused between the structural surfaces of the corresponding prism sheets is minimized and the moiré patterns can be suppressed or removed, so that highly reliable prism sheets adapted to the backlight unit can be obtained.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 1 is a disassembled perspective view of an assembly of a backlight unit employing a conventional prism sheet;

FIG. 2 is a cross-sectional view of FIG. 1 taken along the line A1-A2;

FIGS. 3A and 3B are magnified perspective views illustrating structure of a conventional flexible film that can be adapted to the backlight unit;

FIG. 4 is a cross-sectional view of the conventional flexible film that can be adapted to the backlight unit;

FIG. 5 is an inverted cross-sectional view of FIG. 4;

FIG. 6A illustrates a transmission prism lattice to explain diffraction of light at the prism lattice that is a theory background for structure of the prism sheet according to an embodiment of the present invention;

FIG. 6B illustrates relation between lattice constant and the lattice to explain diffraction of light at the prism lattice that is a theory background for structure of the prism sheet according to an embodiment of the present invention;

FIG. 7A illustrates a general prism lattice sheet to compare diffraction properties of prism sheets that have a center of structural surface;

FIG. 7B illustrates a prism lattice sheet according to the present invention to compare diffraction properties of prism sheets that have a center of structural surface;

FIG. 8A is a reference diagram illustrating arrangement and illumination of prism lattice sheets having a predetermined lattice to compare illuminations in lattice structure of the prism sheets that have a center of structural surface;

FIG. 8B is a reference diagram illustrating arrangement and illumination of prism lattice sheets having a predetermined lattice changing periodically to compare illuminations in lattice structure of the prism sheets that have a center of structural surface;

FIG. 9 illustrates phase difference according to a structural surface and change of thickness of a prism sheet;

FIG. 10A illustrates a prism sheet according to an embodiment of the present invention in x-direction; and FIG. 10B illustrates a prism sheet according to an embodiment of the present invention in y-direction.

BEST MODE FOR CARRYING OUT THE INVENTION

Reference will now be made in detail to the preferred embodiments of the present invention, examples of which are illustrated in the accompanying drawings.

FIG. 6A illustrates a transmission prism lattice to explain diffraction of light at the prism lattice that is a theory background for structure of the prism sheet according to an embodiment of the present invention. FIG. 6B illustrates relation between lattice constant and the lattice to explain diffraction of light at the prism lattice that is a theory background for structure of the prism sheet according to an embodiment of the present invention. FIG. 7A illustrates a general prism lattice sheet to compare diffraction properties of prism sheets that have a center of structural surface. FIG. 7B illustrates a prism lattice sheet according to the present invention to compare diffraction properties of prism sheets that have a center of structural surface. FIG. 8A is a reference diagram illustrating arrangement and illumination of prism lattice sheets having a predetermined lattice to compare illuminations in lattice structure of the prism sheets that have a center of structural surface. FIG. 8B is a reference diagram illustrating arrangement and illumination of prism lattice sheets having a predetermined lattice changing periodically to compare illuminations in lattice structure of the prism sheets that have a center of structural surface. FIG. 9 illustrates phase difference according to a structural surface and change of thickness of a prism sheet. FIG. 10A illustrates a prism sheet according to an embodiment of the present invention in x-direction. FIG. 10B illustrates a prism sheet according to an embodiment of the present invention in y-direction.

The prism sheet according to an embodiment of the present invention has a structural surface 14 on one side thereof and a flat surface 15 opposing the structural surface on another side thereof. The structural surface 14 includes a linear arrangement of right-angled isosceles triangular prisms arranged in parallel and configured to form a plurality of peaks 11 and valleys 12, each of the prisms having perpendicular surfaces that slant by an angle of approximately 45° with respect to the flat surface 15. The structural surface 14 is configured to have non-planar peaks 11 with a maximum height and a minimum height along a length direction of the peak. A curved layer 17 having the same cycle as a cycle of height variation of the peak is formed at a boundary surface 16 between the structural surface 14 and the flat surface so as to maintain the right-angled isosceles triangular prisms formed due to a difference between the highest point and the lowest point of each of the peaks to have a predetermined size so that a distance between the valleys 12 is uniform along the length direction.

The peak 11 is shaped in a streamline curvature 18 in which a difference between the maximum height to the minimum height is shown in a fluent curvature. The streamline curvature formed due to the difference between heights of the peaks has a cycle, which is repeated periodically or non-periodically.

Preferably, the prism sheet is made of transparent and flexible polymer film. The polymer film can be made of any one polymer selected from the group consisting of acrylate, polycarbonate, polyester, and polyvinyl chloride.

The polymer film can be either a multi-layer film in which acrylate is laminated on polycarbonate or a multi-layer film in which acrylate is laminated on polyester.

The prism sheet is constructed such that at least two prisms are arranged every unit pixel for the LCD, i.e., the prism has a size of 0.127 mm or less so that the condensing function of the prism can be constantly exhibited for each of LCD pixels without a complicated alignment of the prism sheet with the LCD panel.

Also, it is desirable that the peak has the height variation h of the range of 0.125-2.5 μm in which constructive interference and destructive interference are not caused in visible light range so as to minimize moire phenomenon.

A backlight unit according to an embodiment of the present invention, employing such prism sheets 10 includes at least one prism sheet including non-planar peaks 11 and a curved layer 17. The non-planar peaks 11 have a maximum height and a minimum height distinguished along a length direction. The curved layer 17 having the same cycle as a cycle of height variation of the peak is formed at a boundary surface 16 between the structural surface 14 and the flat surface so as to maintain the right-angled isosceles triangular prisms formed due to a difference between the highest point and the lowest point of the peak to have a predetermined size, so that a distance between the valleys 12 is uniform along the length direction.

The theoretical background of the structure of the prism sheet according to the embodiment of the present invention will be described referring to FIGS. 6 to 9. The basic theory starts from the diffraction lattice theory.

Diffraction lattice is meant by an apparatus in which the diffraction holes or obstacles are arranged periodically to generate a periodic variation in the phase and/or the amplitude of an emitting wave. The diffraction lattice is devised by David Rittenhouse who is an American astronomer in 1785. A few years later, Joseph von Fraunhofer found this principle again independently and rendered great services to theories and technology on lattice. Wave surface that has passed an apparatus in which thin wire or thread is wound between two parallel screws is modulated in amplitude due to an arrangement in which transparent portions and opaque portions are alternatively repeated. Therefore, the multi-slit arrangement is called transmission amplitude lattice, and more general, transmission amplitude lattice is made by scratching or digging parallel grooves on a flat and transparent glass plate.

In other words, each of the formed grooves serves as a scattering light source and the whole grooves forms an arrangement of linear light sources that are parallel with one another and regular. A lattice transmits light completely with little amplitude modulation and has an optical thickness regularly varied. Such a lattice causes a phase modulates and is called transmission phase lattice. In this case, the shape of the wave surface instead of amplitude is changed periodically as shown in FIG. 6a and includes continuously distributed plane and components.

Furthermore, there are various phenomena such as reflection phase lattice. The conventional lattice that has irregular periods minimizes transmission amplitude lattice phenomenon. The conventional lattice that uses multi-sheet belongs to the manner that to minimizing transmission phase lattice phenomenon. The present invention provides the manner to minimize the diffraction effect using transmission amplitude and phase conditions.

When seeing the linear light sources arranged in parallel from the distant front through the transmission lattice, an eye serves as a focal lens forming diffraction pattern. Following equation 1 is a diffraction lattice equation on perpendicular incidence.

$$a \sin \theta_m = m \lambda \qquad \text{Equation 1}$$

where m is an order of a principal maximum value.

For a light source such as a tungsten filament that has wide and continuous spectra, the image of zeroth order or m=0 corresponds to white light that is not deflected ($\theta_0$).

Since the diffraction lattice equation depends on wavelength, the image of various colors distributed corresponding to the angle $\theta_m$ that is a little bit different with respect to any value in which m≠0 forms continuous spectra. The most images corresponding to small auxiliary maximum values gets very easy to observe. In the case of spectra of first order, the spectra where m=±1 appear on both sides of $\theta_0$ and the spectra of higher orders where m=±2, ±3, ... appear alternatively with dark space.

The phase condition can be represented as equation 2.

$$AB - CD = \alpha(\sin \theta_m - \sin \theta_i) \qquad \text{Equation 2}$$

The most important problem is the directionality when m=0 since the white light that is not deflected is interfered.

FIG. 7A illustrates the lattice structure of a general prism sheet and FIG. 7B illustrates the lattice structure of a general prism sheet according to the present invention. FIGS. 7A and 7B is provided to compare such lattice structures and describe diffraction properties.

Considering a beams group in which the waves emitted from the lattices illustrated in FIG. 7B travel in parallel with each other. The waves will be converged at a point of a predetermined position and each of the phases of the waves has any value between 0 and $2\pi$ with the same probability. Here, what we want to know is the light wave made of superposition of the N phasors which have the same phase and relative phases.

It is important that the sum of many phase differences of waves having arbitrary phases is not zero unlike general expectation. The phase difference is the most important in diffraction. This is the physical basis of the present invention.

In other words, the incident light group derives the light in the direction perpendicular to the surface of the lattice and changes phase difference so that amplitude variation in traveling direction of the prism lattice is derived without diffraction phenomenon to the eyes of an observer. That the beams group is derived in the direction perpendicular to the lattice surface means that the distribution of the effective index of diffraction is changed due to periodic amplitude variation in the traveling direction. Since the light moves toward the portion whose effective index of diffraction is higher, the direction of the light is changed.

FIG. 7A illustrates that the light is diffracted since the light is derived in the same direction at one point. It is because the phase same as the phase of a projected wave is developed. However, in this case, since the sum of the phases is not zero at one point because of the above-mentioned physical basis, the interference is reduced. It is because the sum of the phases is not zero.

Considering the present invention physically and concretely, if the average of the irradiance of the lattice for a specific point of off-axis as shown in FIG. 8 is found, the average irradiance ($I_{aver}$:average) is as N times as the irradiance $I_0$ of a single lattice, so that $I_{aver}=NI_0$.

However, the irradiance of a point of a lattice is very different from the average even if N is very large. So, a specific pattern corresponding to each lattice is dispersed as distribution of bundle of fiber Due to fluctuation between observer points.

In the case of FIG. 8B, since irradiance values are different from each other unlike the case of FIG. 8A, the observers feel confused and the diffraction efficiency is reduced.

The method to minimize diffraction interference of transmission amplitude lattice was described above. The phase variation will be described as follows.

Referring to the front view of the prism sheet of the present invention, the phase variation can be easily found. FIG. 9 is the transparent front view of a prism sheet.

Another advantage of the present invention is that the phase difference is considered at the thickness. The real product shows the variation as much as the thickness ($\delta$). The above-mentioned amplitude makes not only the difference of the amount of irradiance but also phase difference. The phase difference can be represented as the following equation 3.

$$\Psi_0 - \Psi_1 = kn\delta \qquad \text{Equation 3}$$

The portion depicted by dotted line in FIG. 9 illustrates a portion of transmission. $\psi_0$ and $\psi_1$ imply the phase path differences of their lattices. Here, k is the number of waves, n is index of diffraction of lattice and $\delta$ is thickness variation.

The thickness difference makes the difference of $\psi_0$ and $\psi_1$ be non-zero so that diffraction effect is reduced. Even though the light transmits again due to internal reflection, the difference appears the same.

The principles used in the present invention are the transmission amplitude lattice theory and the phase lattice theory. In the transmission amplitude lattice theory, the diffraction efficiency reduction was described by using fluctuation phenomenon at the point of view of the observers caused by deflection of light due to effective index of diffraction and irradiance difference. The attenuation of diffraction interference was described using the fact that the thickness variation cannot make the difference of the phase paths be zero based on the phase lattice theory.

The prism sheet according to the embodiment of the present invention will be described referring to FIG. 10.

Considering the structure of the prism sheet 10 of the present embodiment, the structural surface 14 of the prism sheet 10 has non-planar peaks 11 which have distinguished the maximum height and the minimum height along a length direction, as shown in FIGS. 10A and 10B. The curved layer 17 is formed to have the same cycle as a cycle of height variation of the peak is formed at the boundary surface 16 between the structural surface 14 and the flat surface so as to maintain the right-angled isosceles triangular prisms formed due to the difference between the highest point and the lowest point to have a predetermined size, so that the distance between the valleys 12 is uniform along the length direction.

The peak 11 is shaped in the streamline curvature 18 in which a difference between the maximum height to the minimum height is shown in a fluent curvature. The streamline curvature formed due to the difference between heights of the peaks has a cycle, which is repeated periodically or non-periodically.

The prism sheet according to the present invention has the structure in which the height varying along the length direction (y direction) with a predetermined period ($\lambda$). When applying the range in which constructive interference or destructive interference is not made to equation 3, we can obtain equation 4.

$$\frac{m\pi}{2kn} < \delta < \frac{m\pi}{kn} r, \quad \frac{1}{4}\lambda < \delta < \frac{1}{2}\lambda \qquad \text{Equation 4}$$

Considering first diffraction (m=1), kn=$\pi/\lambda$ where $\lambda$ is wavelength (0.4-0.6 μm) of visible light. When substantially average value (0.5 μm) is selected, the variation ($\delta$) of height is about 0.125-0.25 μm. If the height of the prism is 25 μm, the height variation is about 0.5-1% of the height of the prism. However, in the case of moiré, since the diffraction of 1-10 should be considered, the height variation is about 0.125-2.5 μm.

When using such a prism sheet 10 according to the present invention as a lower prism sheet and folding it with an upper prism sheet to apply the prism sheet 10 to the backlight unit, the range in which the diffraction can occur between sheet peak 11 that has a varying height and an adjacent sheet is reduced so that the optical coupling between the sheet peak 11 and the adjacent sheet is reduced.

In other words, since only the maximum point of the sheet peaks 11 is contacted with the flat surface 15 that is the bottom surface of the upper prism sheet, the most of the conventional moire patterns caused by the optical coupling can be removed although two sheets are used in fold in case the peak structure with the height variation is employed.

INDUSTRIAL APPLICABILITY

The prism sheet structure of the backlight unit according to the present invention as described above reduces the range of the diffraction with the upper sheet and reduces the optical coupling so that the moir 6 pattern is suppressed and the high quality of image can be provided.

While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents.

The invention claimed is:

1. A prism sheet of a backlight unit for an LCD, the prism sheet having a structural surface (14) on one side thereof and a flat surface (15) opposing the structural surface on another side thereof, the structural surface (14) including a linear arrangement of right-angled isosceles triangular prisms arranged in parallel and configured to form a plurality of peaks (11) and valleys (12), each of the prisms having perpendicular surfaces that slant by an angle of approximately 45.degree. with respect to the flat surface (15),
   wherein the structural surface (14) is configured to have non-planar peaks (11) with a maximum height and a minimum height along a length direction of the peak, and a curved layer (17) having the same cycle as a cycle of height variation of the peak is formed at a boundary surface (16) between the structural surface (14) and the flat surface so as to maintain the right-angled isosceles triangular prisms formed due to a difference between the highest point and the lowest point of each of the peaks to have a predetermined size so that a distance between the valleys (12) is uniform along the length direction, and
   wherein the peak has a height variation of 0.125 - 2.5 μm.

2. The prism sheet of claim 1, wherein the peak is shaped in a streamline curvature 18 in which a difference between the maximum height to the minimum height is shown in a fluent curvature.

3. The prism sheet of claim 1, wherein a streamline curvature formed due to a difference between heights of the peaks has a cycle, which is repeated periodically or non-periodically.

4. The prism sheet of claim 1, wherein the prism sheet is made of transparent and flexible polymer film.

5. The prism sheet of claim 4, wherein the polymer film is made of any one polymer selected from the group consisting of acrylate, polycarbonate, polyester, and polyvinyl chloride.

6. The prism sheet of claim 4, wherein the polymer film is a multi-layer film in which acrylate is laminated on polycarbonate.

7. The prism sheet of claim 4, wherein the polymer film is a multi-layer film in which acrylate is laminated on polyester.

8. The prism sheet of claim 1, wherein the prism sheet is constructed such that at least two prisms are arranged every unit pixel for the LCD, i.e., the prism has a size of 0.127 mm or less.

9. A backlight unit having two or more prism sheets of which prisms are crossed with each other by a predetermined angle, each the prism sheets having a structural surface (14) on a side thereof and a flat surface (15) opposing the structural surface on another side thereof, the structural surface (14) including a linear arrangement of right-angled isosceles triangular prisms arranged in parallel and configured to form a plurality of peaks (11) and valleys (12), each of the prisms having perpendicular surfaces that slant by an angle of approximately 45.degree. with respect to the flat surface (15),
   wherein the structural surface (14) of at least one of the prism sheets is configured to have non-planar peaks (11) with a maximum height and a minimum height along a length direction of the peak, and a curved layer (17) having the same cycle as a cycle of height variation of the peak is formed at a boundary surface (16) between the structural surface 14 and the flat surface so as to maintain the right-angled isosceles triangular prisms formed due to a difference between the highest point and the lowest point of each of the peaks to have a predetermined size so that a distance between the valleys (12) is uniform along the length direction, and
   wherein the peak of the prism sheet has a height variation of 0.125 - 2.5 μm.

10. The prism sheet of claim 9, wherein the peak is shaped in a streamline curvature 18 in which a difference between the maximum height to the minimum height is shown in a fluent curvature.

11. The prism sheet of claim 9, wherein a streamline curvature formed due to a difference between heights of the peaks has a cycle, which is repeated periodically or non-periodically.

12. The backlight unit of claim 9, wherein the prism sheet is made of transparent and flexible polymer film.

13. The backlight unit of claim 12, wherein the polymer film is made of any one polymer selected from the group consisting of acrylate, polycarbonate, polyester, and polyvinyl chloride.

14. The backlight unit of claim 12, wherein the polymer film is a multi-layer film in which acrylate is laminated on polycarbonate.

15. The backlight unit of claim 12, wherein the polymer film is a multi-layer film in which acrylate is laminated on polyester.

* * * * *